No. 661,380. Patented Nov. 6, 1900.
P. MORDAN & M. ROEHR.
COMBINED OIL CAN AND MEASURER.
(Application filed July 9, 1900.)
(No Model.)

Witnesses:
C. D. Kesler
J. B. Keefe

Inventors
Paul Mordan
Magnus Roehr
By James L. Norris
Atty.

United States Patent Office.

PAUL MORDAN AND MAGNUS ROEHR, OF CHICAGO, ILLINOIS.

COMBINED OIL CAN AND MEASURER.

SPECIFICATION forming part of Letters Patent No. 661,380, dated November 6, 1900.

Application filed July 9, 1900. Serial No. 23,020. (No model.)

*To all whom it may concern:*

Be it known that we, PAUL MORDAN and MAGNUS ROEHR, citizens of the United States, residing at Chicago, in the county of Cook and State of Illinois, have invented new and useful Improvements in a Combined Oil Tank and Measurer, of which the following is a specification.

Our invention relates to improvements in a combined oil tank and measurer, and has for its principal objects to provide an improved support for the tank and to so secure the measuring vessel in relation thereto that said vessel shall not extend below the support of the tank.

Other objects of the invention relate to details of construction and to combinations and arrangements of parts, which will hereinafter be described, and particularly pointed out in the claims.

In order that our invention may be understood, we have illustrated the same in the accompanying drawings, in which—

Figure 1:
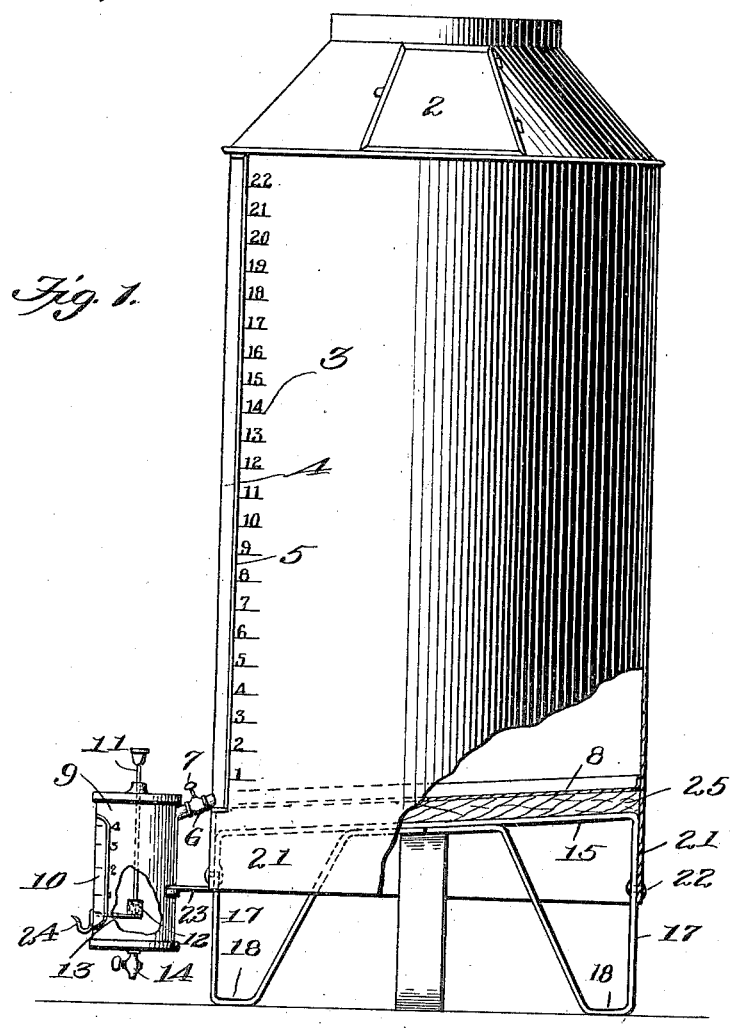
Figure 2:
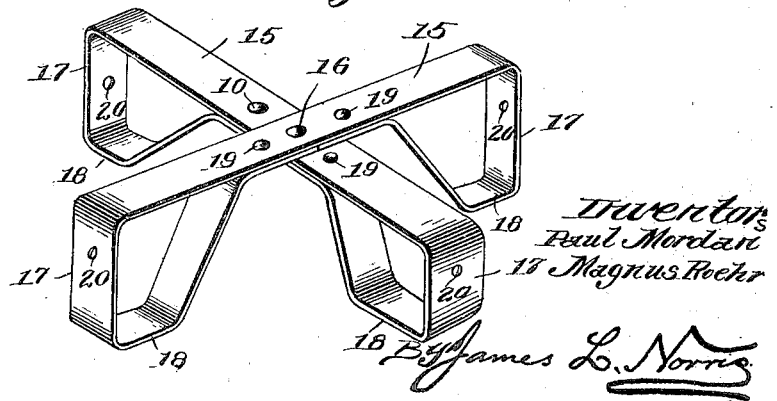

Figure 1 is a side elevation of the apparatus, certain portions of the view being broken away to disclose interior constructions; and Fig. 2 is a perspective view of the improved support.

Referring to the drawings, the numeral 1 indicates the oil-tank, having at its top a door 2, closing a suitable opening through which oil may be supplied to the tank. At its front the tank is provided with a sight-gage 3, extending from top to bottom of the tank. This gage is preferably formed by cutting a strip from the tank and covering the opening by means of a piece of glass 4, secured in place by a metal frame 5, soldered to the tank. The glass may be held in the frame by plaster-of-paris. Along the edge of this glass the tank is provided with a series of graduated marks which are numbered from the bottom to the top from "1" to "22," as shown, so that as the level of the oil, which can be ascertained through the glass 4, corresponds with one or the other of said marks the amount of oil in the tank will be indicated by the number of said mark, the numbers indicating gallons. The numeral 6 indicates the outlet-pipe from the tank, which is located at the bottom of the latter and controlled by a valve 7. The bottom 8 of the tank is inclined downwardly toward the outlet-pipe 6, so that all of the oil may run out of the tank without the necessity of turning or tipping the tank, as is the common practice. The outlet-pipe 6 enters the top of the measuring vessel 9. This measuring vessel is also provided with a sight-gage 10, similar in construction to the gage 3 and having suitable marks thereon to indicate pints, quarts, gallons, &c. Working through the top of the vessel 9 is a rod 11, having on its lower end a float 12, to which is attached a pointer 13. At the bottom of the measuring vessel is a cock 14, through which the contents of the vessel may be withdrawn. The operation will be readily understood. Suppose, for instance, it is desired to draw a gallon of oil from tank 1. The valve 7 is turned to permit the oil to run into the chamber 9. As the oil enters said chamber the float 12 will rise, and as the pointer 13 reaches the "gallon-mark" on the vessel the valve 7 is closed. The cock 14 may now be opened to permit the oil to flow from the vessel into a suitable receptacle.

The tank is mounted upon the support shown in detail in Fig. 2. This support comprises two flat metal bars 15, which cross each other at right angles and are united at their centers by means of a rivet 16. Each of the bars 15 is bent at right angles to itself at its ends, as indicated at 17, which parts are again bent inward at right angles to form the horizontal portions or supports 18, and then the ends are carried up to the under side of the bar, to which they are united by means of the rivets 19. The vertical parts 17 of the support are each provided with an aperture 20. By referring to Fig. 1 it will be seen that the wall of the tank is continued downward below the bottom 8, as indicated at 21. The support shown in Fig. 2 is inserted in this depending annular portion 21 and secured in place by rivets 22, passed therethrough and through the apertures 20 in the support. The measuring vessel 9 is firmly secured to the tank through the medium of the pipe 6 and a brace-plate 23, connected to said vessel and to one of the uprights 17. This construction affords a firm support for the tank, is simple in construction, and is readily secured in position.

By preference we secure to the outer side of the measuring vessel a hook 24, upon which may be hung the bail of the bucket or can to be filled. We also interpose between the supports of the tank and the inclined bottom 8 a wooden block or plate 25 to render said bottom firm.

Having thus fully described our invention, what we claim as new is—

1. In combination with a tank having its side wall extended below its bottom, a support for said tank located within said depending portion, comprising two bars crossing each other at right angles and riveted together at the point of crossing, said bars having their end portions bent downward, inward and upward, to form legs, and having said downwardly-bent portions secured to the depending portion of the wall of the tank, substantially as described.

2. A support for oil-tanks comprising two bars crossed and secured at right angles and having their end portions bent downward, inward and then upward to the under sides of the bars and being secured thereto by rivets, or the like, substantially as described.

In testimony whereof we have hereunto set our hands in presence of two subscribing witnesses.

PAUL MORDAN.
MAGNUS ROEHR.

Witnesses:
THOMAS YOUNG,
C. A. LUNDQUIST.